US008683918B1

(12) United States Patent
Witham et al.

(10) Patent No.: US 8,683,918 B1
(45) Date of Patent: Apr. 1, 2014

(54) SYSTEM FOR REMOVING DEBRIS FROM A HARVESTED TREE CROP PRODUCT

(76) Inventors: Rick Witham, Woodland, CA (US); Ed Witham, Jr., Woodland, CA (US)

(*) Notice: Subject to any disclaimer, the term of this patent is extended or adjusted under 35 U.S.C. 154(b) by 83 days.

(21) Appl. No.: 13/199,244

(22) Filed: Aug. 24, 2011

(51) Int. Cl.
*A23N 15/00* (2006.01)
*B07B 13/02* (2006.01)
*B07B 13/04* (2006.01)
*A23N 15/02* (2006.01)

(52) U.S. Cl.
CPC .................. *A23N 15/02* (2013.01)
USPC .............. 99/640; 99/628; 209/673; 426/478; 426/481

(58) Field of Classification Search
USPC .................. 99/625, 628, 635, 638, 640, 641; 209/673, 669; 426/478, 481
See application file for complete search history.

(56) References Cited

U.S. PATENT DOCUMENTS

| 3,217,346 | A | * | 11/1965 | Silver et al. ............... 15/3.11 |
| 3,985,233 | A | * | 10/1976 | Sherman ................... 209/671 |
| 4,000,747 | A | | 1/1977 | Rodger |
| 4,136,507 | A | | 1/1979 | Hobbs |
| 4,542,687 | A | | 9/1985 | Johnson |
| 4,696,151 | A | | 9/1987 | Hobbs |
| 5,138,826 | A | | 8/1992 | Hobbs |
| 5,824,356 | A | * | 10/1998 | Silver et al. ............... 426/481 |
| 5,980,382 | A | | 11/1999 | Brantly et al. |
| 6,237,778 | B1 | * | 5/2001 | Weston ..................... 209/672 |
| 7,682,235 | B2 | | 3/2010 | Ferraris |
| 2006/0180524 | A1 | * | 8/2006 | Duncan et al. ............. 209/672 |

FOREIGN PATENT DOCUMENTS

| CN | 2597104 Y | 1/2004 |
| CN | 201153405 Y | 11/2008 |
| CN | 201153406 Y | 11/2008 |
| CN | 201267106 Y | 7/2009 |

* cited by examiner

*Primary Examiner* — Reginald L Alexander
(74) *Attorney, Agent, or Firm* — Thomas R. Lampe

(57) ABSTRACT

A system for removing debris from tree crop product utilizes a plurality of screening and transport rollers which have disk-shaped members having projections that are curved and extend rearwardly in a direction opposed to the direction of rotation of the rollers, at least a portion of the projections of adjacent rollers overlapping to form voids.

16 Claims, 5 Drawing Sheets

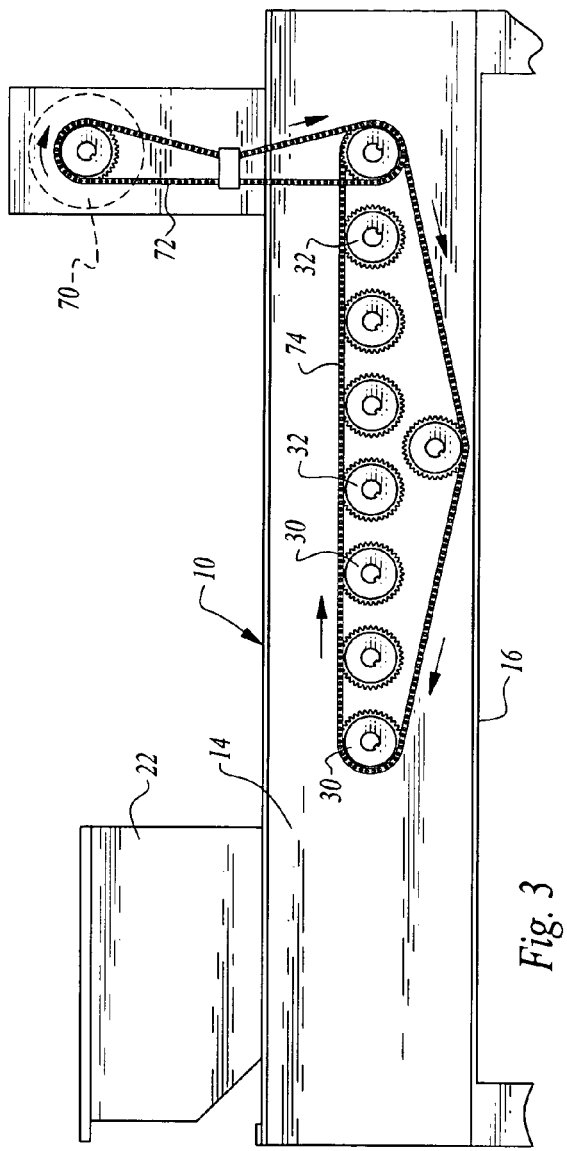
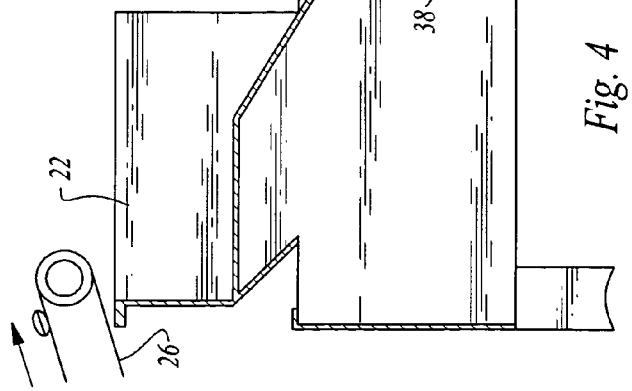
Fig. 3
Fig. 4

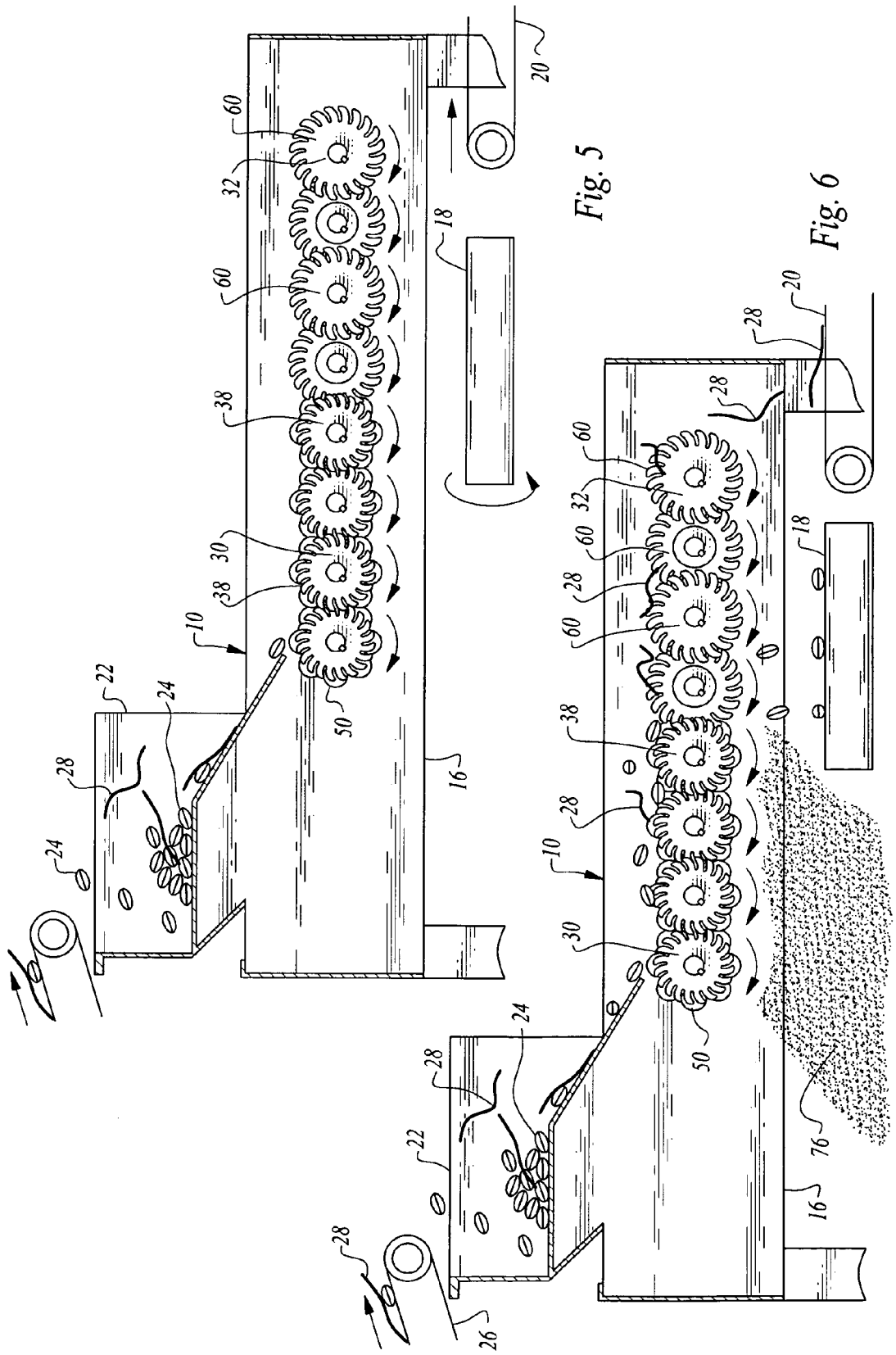

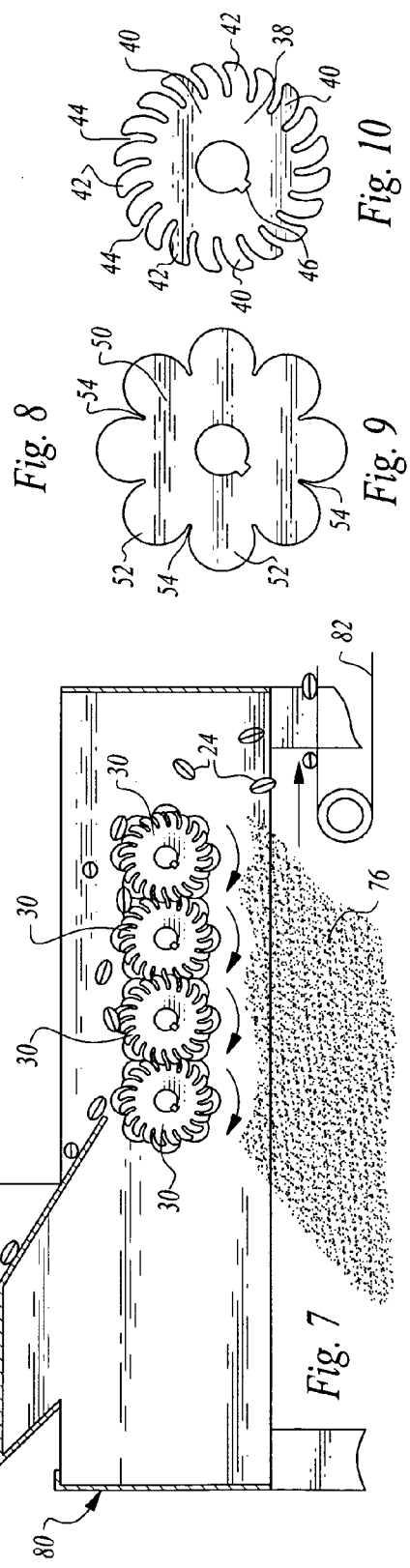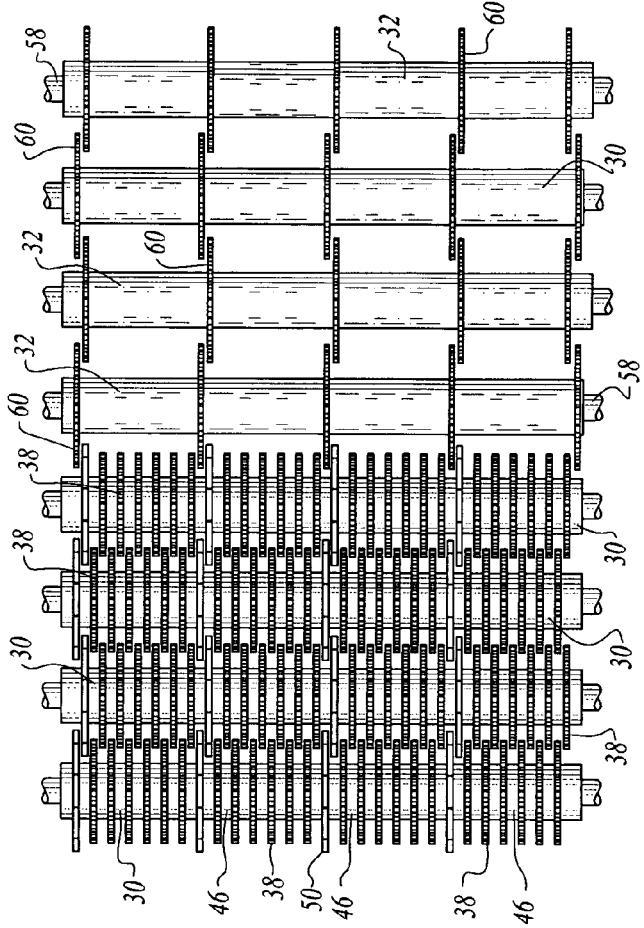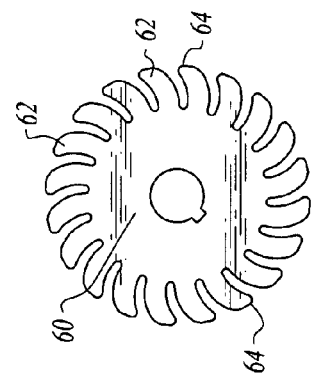
Fig. 7
Fig. 8
Fig. 9
Fig. 10
Fig. 11

SYSTEM FOR REMOVING DEBRIS FROM A HARVESTED TREE CROP PRODUCT

TECHNICAL FIELD

This invention relates to an apparatus and method for removing dirt and other debris from harvested nuts and other types of tree crop product.

BACKGROUND OF THE INVENTION

Nut harvesters and pick up machines that are presently on the market use a conveyor belt screen that allows the debris to fall through the screen as it travels and is delivered into a cart for delivery to the processing plant. Although this approach has been used for quite some time, it does not remove all of the dirt, dust or debris. Furthermore, it does not remove sticks, a large number of which often accompany harvested tree crop product of various types.

As will be seen below, the present invention utilizes a plurality of screening and transport rollers to separate dirt and other debris from harvested nuts and other types of tree crop product. While rollers and the like have been employed in connection with harvesting of various crops for one purpose or another, the rollers or rotors differ in structure from those of the present invention. Furthermore, there is no teaching or suggestion whatsoever in the located prior art of using such systems other than in connection with harvesting of ground crops. The following patents are believed to be representative of the current state of the prior art pertaining to harvesting of ground crops: U.S. Pat. No. 7,682,235, issued Mar. 23, 2010, U.S. Pat. No. 5,980,382, issued Nov. 9, 1999, U.S. Pat. No. 5,138,826, issued Aug. 18, 1992, U.S. Pat. No. 4,696,151, issued Sep. 29, 1987, U.S. Pat. No. 4,542,687, issued Sep. 24, 1985, U.S. Pat. No. 4,136,507, issued Jan. 30, 1979, U.S. Pat. No. 4,000,747, issued Jan. 4, 1977, Chinese Patent No. CN2597104Y, issued Jan. 7, 2004, Chinese Patent No. CN201267106Y, issued Jul. 8, 2009 and Chinese Patent No. CN201153406Y issued Nov. 26, 2008 and Chinese Patent No. CN201153405Y, issued Nov. 26, 2008.

DISCLOSURE OF INVENTION

The present invention relates to both an apparatus and a method for efficiently and effectively removing dirt and other debris from harvested nuts and other types of tree crop product.

The system includes a roller support frame having opposed, spaced support frame members defining an opening.

A plurality of double-ended screening and transport rollers are rotatably supported at the ends thereof by the support frame members and extend across the opening. The axes of rotation of the screening and transport rollers are parallel and orthogonally disposed relative to the support frame members.

The screening and transport rollers are simultaneously rotated in a predetermined direction of rotation by transmission structure connected to a prime mover.

Each of the screening and transport rollers includes a shaft and a plurality of disk-shaped members spaced from one another and radiating outwardly from the shaft.

The disk-shaped members include spaced projections having free distal ends and defining open ended slots therebetween. The projections are curved and extend rearwardly in a direction opposed to the direction of rotation of the screening and transport rollers by the prime mover.

The disk-shaped members of adjacent screening and transport rollers are offset relative to one another with the projections of adjacent screening and transport rollers at least partially overlapping and defining voids communicating with the opening allowing debris to fall between the screening and transport rollers during transport of product by the screening and transport rollers to a predetermined location.

Other features, advantages and objects of the present invention will become apparent with reference to the following description and accompanying drawings.

BRIEF DESCRIPTION OF DRAWINGS

FIG. 3 is a side, elevation view of the apparatus illustrating a prime mover in the form of a motor employed to rotate the screening and transport rollers through utilization of a chain link transmission;

FIG. 4 is an enlarged, cross-sectional view illustrating a plurality of screening and transport rollers employed in the apparatus being simultaneously rotated in a predetermined direction during operation of the apparatus;

FIG. 5 is a view similar to FIG. 4, but illustrating a conveyor delivering nuts with associated debris including sticks to the apparatus for separation of the nuts from the debris;

FIG. 6 is a view similar to FIG. 5, but illustrating separation of the nuts from the debris, the stick portions of the debris continuing to be transported for disposal after the nuts have been separated and placed on a conveyor;

FIG. 7 is a view similar to FIG. 6, but illustrating a second embodiment of the invention;

FIG. 8 is a top, plan view of the screening and transport rollers of the first embodiment;

FIGS. 9, 10 and 11 are elevational views of three types of disk-shaped members employed in the screening and transport rollers utilized in the first embodiment of the invention;

MODES FOR CARRYING OUT THE INVENTION

Figures 1, 2:
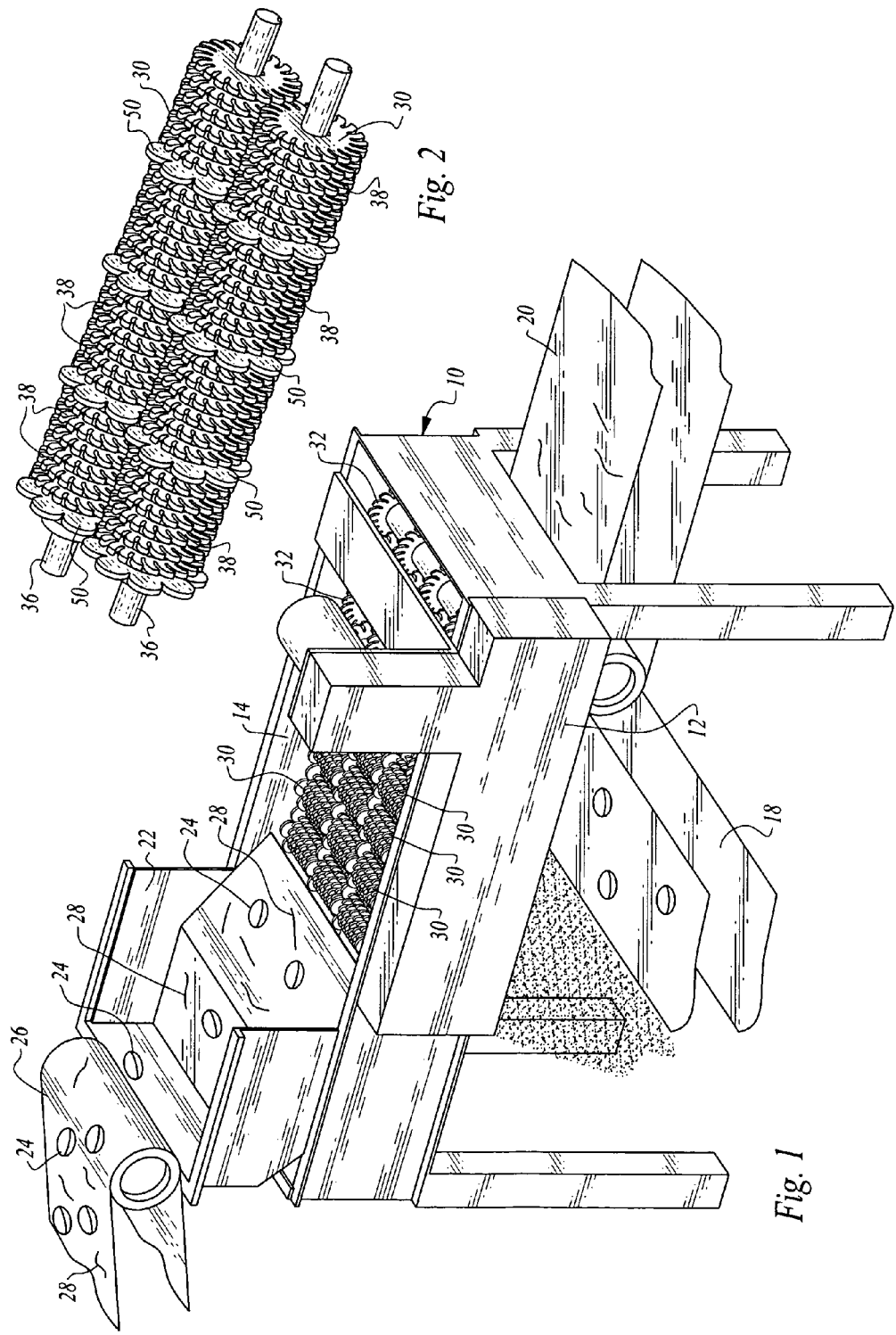
FIG. 1 is a perspective view of a first embodiment of apparatus constructed in accordance with the teachings of the present invention.
FIG. 2 is an enlarged, perspective view illustrating two parallel, adjacent screening and transport rollers utilized in the arrangement illustrated in FIG. 1.

Referring now to FIGS. 1-6 and 7-13, a first embodiment of apparatus constructed in accordance with the teachings of the present invention is illustrated.

The apparatus includes a roller support frame 10 having opposed, spaced support frame members 12, 14 defining an opening 16. Below the opening are belt conveyors 18, 20. A feed hopper 22 receives nuts 24 from a third belt conveyor 26. The belt 26 also conveys and delivers dirt and other debris, including sticks 28 normally associated with the harvesting of nuts and many other types of tree crops, including, but not limited to, almonds, walnuts, pistachios, pecans, olives, etc.

A plurality of double-ended screening and transport rollers are rotatably supported at the ends thereof by the support frame members 12, 14 and extend across the opening 16.

Two types of screening and transport rollers are employed in the illustrated first embodiment of the apparatus. One type of screening and transport roller is designated by reference numeral 30 and the other type of screening and transport roller is designated by reference numeral 32. In the arrangement illustrated, screening and transport rollers 30 are four in number and comprise an upstream set of screening and transport rollers.

There are also four screening and transport rollers 32, rollers 32 comprising a downstream set of screening and transport rollers. Of course, different numbers of rollers 30, 32 may be employed, if desired.

Each of the screening and transport rollers 30 include a shaft 36 and a plurality of disk-shaped members 38 connected to the shaft. With particular reference to FIG. 10, each disk-shaped member 38 includes spaced projections 40 having free distal end portions 42 and defining open-ended slots 44 therebetween.

Figures 12, 13:
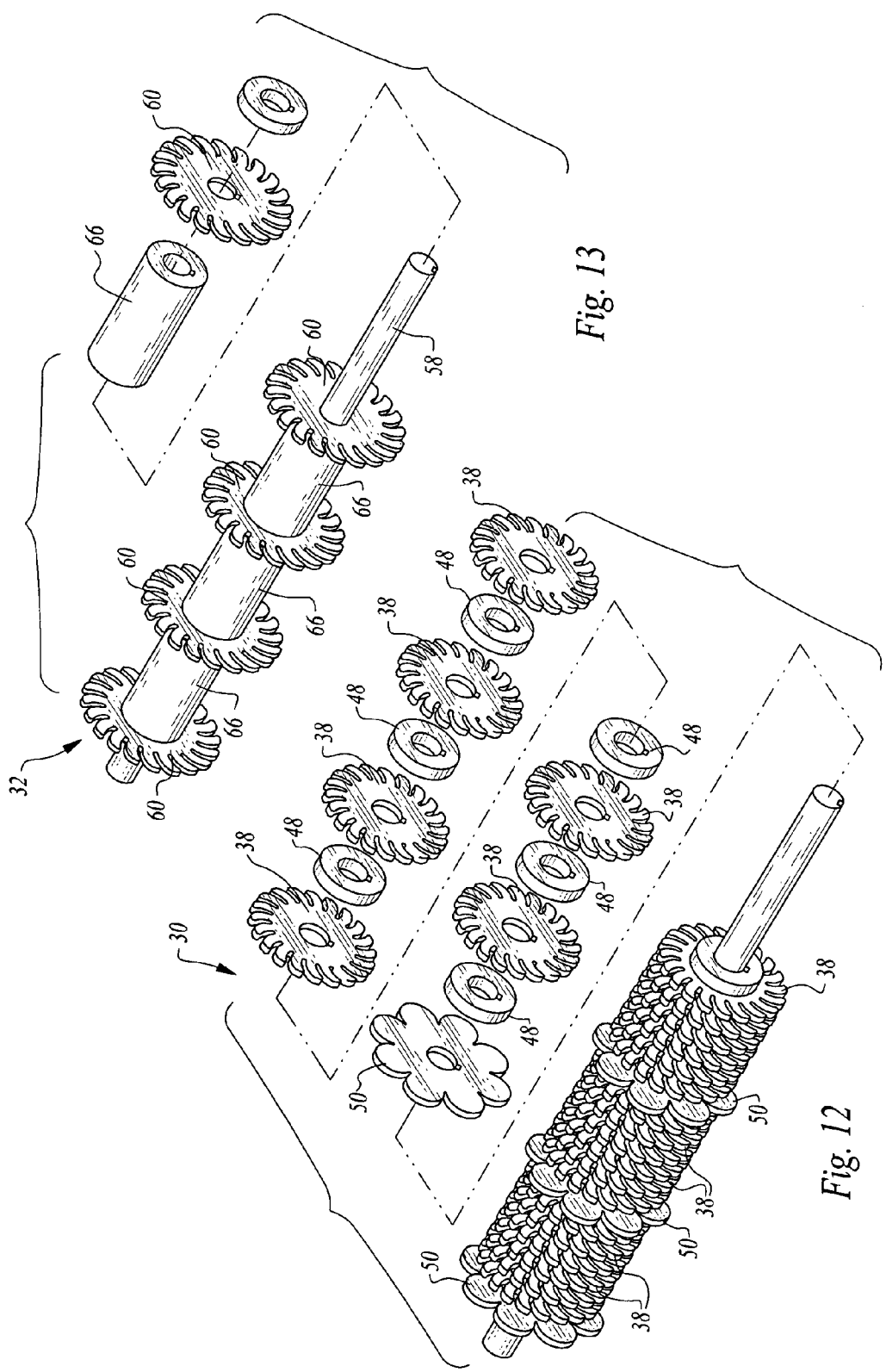
FIG. 12 is an enlarged, exploded, perspective view illustrating component parts in the process of being assembled in one form of screening and transport roller.
FIG. 13 is an enlarged, exploded, perspective view illustrating another form of screening and transport roller employed in the invention being assembled.

In the arrangement illustrated, the disk-shaped members 38 have a key way or slot 46 extending from a central opening which enables the disk-shaped members to be slid on or off the shaft 46, as shown for example in FIG. 12. Any suitable means may be utilized to lock the disk-shaped members against rotation relative to the shaft when installed. For example, a spline (not shown) attached to the shaft can be positioned in slot 46. FIG. 12 illustrates a number of disk-shaped members 38 already slid onto a shaft 36 while other disk-shaped members 38 are illustrated prior to assembly. Removable spacers 48 are utilized to maintain the desired spaced relationship between the disk-shaped members 38.

When installed on shaft 36 the disk-shaped members radiate outwardly from the shaft. The projections 40, as stated above, are curved and these projections extend rearwardly in a direction opposed to the direction of rotation of the screening and transport rollers 30 during operation. FIGS. 4-6 may be referred to in this connection.

Each screening and transport roller 30 also includes a second configuration of disk-shaped member, namely, disk-shaped member 48 (see FIG. 9), which is of generally circular configuration having a plurality of outwardly projecting rounded lobes 52 defining generally V-shaped notches 54. When the disk-shaped members are installed at spaced locations along shaft 36, the lobes 52 project beyond the free distal ends 42 of the curved projections 40. In the arrangement illustrated, a plurality of disk-shaped members 38 are located between and sandwiched by adjacent spaced disk-shaped members 50.

Screening and transport rollers 32 comprising a downstream set of screening and transport rollers which receive nuts from the upstream set of screening and transport rollers 30.

Each screening and transport roller 32 includes a shaft 58 and a plurality of disk-shaped members 60 which have a configuration quite similar to the configuration of disk-shaped members 38 except that the disk-shaped members 60 are larger. Each disk-shaped member 60 has projections 62 having free distal ends 64 and which define open-ended slots. See FIG. 11. As with screening and transport rollers 30, the projections 62 of screening and transport rollers 32 are curved and extend rearwardly in a direction opposed to the direction of rotation of the screening and transport rollers 32 by a prime mover. FIG. 13 shows a screen and transport roller 32 during assembly, each disk-shaped member 60 being separated by a spacer 66 that is longer than the spacers 46 employed in the roller 30.

In the arrangement illustrated, a prime mover in the form of an electric motor 70 (see FIG. 3) is operatively connected to all of the rollers 30, 32 of the apparatus by transmission chains 72, 74. As indicated above, all of the screening and transport rollers 30, 32 rotate in the same direction with the curved projections of disk-shaped members 38, 60 extending rearwardly in a direction opposed to the direction of rotation of the screening and transport rollers.

In both the upstream set of rollers 30 and in the downstream set of rollers 32 the disk-shaped members of adjacent screening and transport rollers are offset relative to one another with the projections of adjacent screening and transport rollers in each set at least partially overlapping and defining voids communicating with the opening 16.

The voids formed by the upstream set of screening and transport rollers 30 are relatively small, allowing debris to fall between the screening and transport rollers 30 during transport of nuts 24 by the screening and transport rollers 30. That is, the voids formed by the disk-shaped members 38 are shaped and relatively positioned to define voids smaller than the nuts and larger than the debris. This may be seen for example in FIG. 6.

The nuts 24 are delivered to the disk-shaped members 60 of the downstream set of rollers and the voids formed by the downstream set of rollers are large enough to allow the nuts 40 to fall onto the belt conveyor 18 through these larger voids. FIG. 6 also depicts most of the debris 76 falling from the upstream set of rollers 30.

The sticks 28 and other types of large debris do not fall between either the rollers 30 or the rollers 32, the voids created by both being smaller than the sticks. The sticks are transported the entire combined length of the upstream and downstream sets of rollers and delivered to conveyor 20 along with any other debris that is too large to fall through the voids created by rollers 30, 32. The lobes 52 of disk-shaped members 50 of the upstream set of rollers engage and transport the sticks and other large debris items to the downstream set of rollers 32 which complete conveyance of the sticks and other large debris particles.

As described above, the disk-shaped members of the apparatus are releasably connected to their respective shafts whereby the disk-shaped members can be selectively removed and replaced by disk-shaped members of the same size and configuration or by disk-shaped members of different sizes or configurations depending upon the size and shape of the product to be cleaned of debris and transported. Different sized spacers may be employed on the shafts for adjusting the distances between and locations of the disk-shaped members on the shafts.

FIG. 7 illustrates a second embodiment 80 of the apparatus which only employs screening and transport rollers 30, as described above, to clean the nuts of debris 76, the nuts 24 dropping off the last of the screening and transport rollers 30 directly onto a conveyor 82 rather than proceeding over a separate downstream set of different screening and transport rollers.

The invention claimed is:

1. Apparatus for removing dirt and other debris from harvested nuts and other types of tree crop product, said apparatus comprising, in combination:

a roller support frame having opposed, spaced support frame members defining an opening;

a prime mover; and a plurality of double-ended screening and transport rollers rotatably supported at the ends thereof by said support frame members and extending across said opening, the axes of rotation of said screening and transport rollers being parallel and extending between said support frame members, each said screening and transport roller including a shaft and a plurality of disk-shaped members spaced from one another and radiating outwardly from said shaft, said disk-shaped members including spaced projections having free distal ends and defining open ended slots or notches therebetween, the projections of at least some of said disk-shaped members being curved and rearwardly extending projections extending in a direction opposed to the direction of rotation of said screening and transport rollers by said prime mover, the disk-shaped members of adjacent screening and transport rollers having the curved and rearwardly extending projections being offset relative to one another with the curved and rearwardly extending projections of adjacent screening and transport rollers at least partially overlapping with the free distal ends thereof spaced from and shafts of adjacent rollers and defining voids between the free distal ends and the shafts communicating with said opening allowing dirt and other debris to fall between the screening and transport rollers during transport of product by the screening and transport rollers to a predetermined location, the disk-shaped members on the shaft of least some of said screening and transport rollers being of different configurations and forming different shaped open-ended slots or notches communicating with said opening.

2. The apparatus according to claim 1 wherein said slots are shaped and relatively positioned to define voids smaller than said product and larger than said debris whereby the debris will fall through said voids under the influence of gravity and whereby the product will continue to be engaged and transported by the projections of said screening and transport rollers after said debris has fallen through said voids.

3. The apparatus according to claim 2 wherein said plurality of screening and product transport rollers include an upstream set of screening and transport rollers and a downstream set of screening and transport rollers, said downstream set of screening and transport rollers receiving product from said upstream set of screening and transport rollers, the voids created by the downstream set of screening and transport rollers being larger than the voids created by the upstream set of screening and transport rollers whereby product will fall through the voids created by said downstream set of screening and transport rollers under the influence of gravity.

4. The apparatus according to claim 3 wherein the diameters of the disk-shaped members of said downstream set of screening and transport rollers are larger than the diameters of the disk-shaped members of said upstream set of screening and transport rollers whereby sticks and any other debris larger than said product will continue to be transported by said downstream set of screening and transport rollers after product has fallen through the voids created by said downstream set of screening and product transport rollers.

5. The apparatus according to claim 1 wherein said disk-shaped members are releasably connected to their respective shafts whereby said disk-shaped members can be selectively removed and replaced by disk-shaped members of the same size and configuration or by disk-shaped members of different sizes or configurations depending upon the size and shape of the product to be cleaned of debris and transported.

6. The apparatus according to claim 5 including selectively removable spacers on said shafts for adjusting the distances between and locations of said disk-shaped members on said shafts.

7. The apparatus according to claim 1 wherein the disk-shaped members of different configurations include a plurality of spaced disk-shaped members of generally circular configuration having a plurality of outwardly projecting rounded lobes defining generally V-shaped notches, said lobes projecting beyond the free distal ends of the projections defining open ended slots therebetween of adjacent disk-shaped members.

8. The apparatus according to claim 1 additionally comprising transmission structure between said prime mover and said screening and transport rollers to rotate said screening and transport rollers in a direction opposite the direction of curvature of said projections.

9. The apparatus according to claim 1 additionally comprising conveyor structure for receiving product transported to said predetermined location.

10. A method of removing dirt and other debris from harvested nuts and other types of tree crop product, said method comprising the steps of:

rotatably supporting a plurality of double-ended screening and transport rollers on spaced support frame members with said screening and transport rollers extending across an opening between said support frame members, the axes of rotation of said screening and transport rollers being parallel and extending between said support frame members, each said screening and transport roller including a shaft and a plurality of disk-shaped members spaced from one another and radiating outwardly from said shaft;

simultaneously rotating said disk-shaped members in a predetermined direction of rotation, said disk-shaped members including spaced projections having free distal ends and defining open ended slots or notches therebetween, the projections of at least some of said disk-shaped members being curved and rearwardly extending projections extending in a direction opposed to the direction of rotation of said screening and transport rollers, the disk-shaped members of adjacent screening and transport rollers having the curved and rearwardly extending projections being offset relative to one another with the projections of adjacent screening and transport rollers at least partially overlapping with the free distal ends thereof spaced from the shafts of adjacent rollers and defining voids between the free distal ends and the shafts communicating with said opening; and allowing dirt and other debris to fall between the screening and transport rollers during transport of product by the screening and transport rollers to a predetermined location, disk-shaped members of different configurations on the shaft of at least some of said screening and transport rollers being of different configurations and forming different shaped open-ended slots or notches communicating with said opening.

11. The method according to claim 10 wherein said slots are shaped and relatively positioned to define voids smaller than said product and larger than said debris whereby the debris will fall through said voids under the influence of gravity and whereby the product will continue to be engaged and transported by the projections of said screening and transport rollers after said debris has fallen through said voids.

12. The method according to claim 11 wherein said plurality of screening and product transport rollers include an upstream set of screening and transport rollers and a downstream set of screening and transport rollers, said downstream set of screening and transport rollers receiving product from said upstream set of screening and transport rollers, the voids created by the downstream set of screening and transport rollers being larger than the voids created by the upstream set of screening and transport rollers whereby product will fall through the voids created by said downstream set of screening and transport rollers under the influence of gravity.

13. The method according to claim 12 wherein the diameters of the disk-shaped members of said downstream set of screening and transport rollers are larger than the diameters of the disk-shaped members of said upstream set of screening and transport rollers, the method including employing said downstream set of screening and transport rollers to transfer sticks and any other debris larger than the product after product has fallen through the voids created by said downstream set of screening and product transport rollers.

14. The method according to claim 10 wherein said disk-shaped members are releasably connected to their respective shafts whereby said disk-shaped members can be selectively removed and replaced by disk-shaped members of the same size and configuration or by disk-shaped members of different sizes or configurations depending upon the size and shape of the product to be cleaned of debris and transported.

15. The method according to claim 14 including utilizing selectively removable spacers on said shafts to adjust the distances between and locations of said disk-shaped members on said shafts.

16. The method according to claim 10 wherein the disk-shaped members of different configurations include a plurality of spaced disk-shaped members of generally circular configuration having a plurality of outwardly projecting rounded lobes defining generally V-shaped notches, said lobes projecting beyond the free distal ends of the projections defining open ended slots therebetween of adjacent disk-shaped members, said method including the step of employing said lobes to engage, support and transport sticks and other large debris.

\* \* \* \* \*